(12) United States Patent
Gopalarathnam et al.

(10) Patent No.: US 11,108,467 B2
(45) Date of Patent: Aug. 31, 2021

(54) OPTICAL TRANSCEIVER MONITORING SYSTEM

(71) Applicant: Dell Products L.P., Round Rock, TX (US)

(72) Inventors: Sudharsan Dhamal Gopalarathnam, Redmond, WA (US); Vamshidhar Varre, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/752,015

(22) Filed: Jan. 24, 2020

(65) Prior Publication Data

US 2021/0234613 A1 Jul. 29, 2021

(51) Int. Cl.
*H04B 10/40* (2013.01)
*H04B 10/079* (2013.01)
*H04B 10/50* (2013.01)
*H04B 10/43* (2013.01)
*H04B 10/60* (2013.01)

(52) U.S. Cl.
CPC ......... *H04B 10/40* (2013.01); *H04B 10/0795* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 2003/0152390 A1* | 8/2003 | Stewart | .................. | H04B 10/40 398/135 |
| 2004/0047635 A1* | 3/2004 | Aronson | ................ | H04B 10/07 398/138 |
| 2007/0065151 A1* | 3/2007 | Dybsetter | .............. | H04B 10/40 398/135 |
| 2016/0157075 A1* | 6/2016 | Ho | ........................ | H04W 4/023 455/404.2 |
| 2018/0054793 A1* | 2/2018 | Renaldi | ................. | H04W 64/00 |

* cited by examiner

*Primary Examiner* — Darren E Wolf
(74) *Attorney, Agent, or Firm* — Haynes and Boone, LLP (57) ABSTRACT

An optical transceiver monitoring system includes an optical transceiver device that includes a non-volatile memory system, and a computing device that includes a computing device port that is coupled to the optical transceiver device. The computing device monitors the computing device port and, in response, detects one or more interactions between the optical transceiver device and the computing device. The computing device determines that the one or more interactions satisfy an event condition, and in response to the one or more interactions satisfying the event condition, provides first event information that corresponds to the one or more interactions to the optical transceiver device for storage in the non-volatile memory system.

20 Claims, 7 Drawing Sheets

OPTICAL TRANSCEIVER MONITORING SYSTEM

BACKGROUND

The present disclosure relates generally to information handling systems, and more particularly to monitoring for events associated with a transceiver device that transmits data optically between information handling systems, and storing corresponding event information on the transceiver device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are sometimes configured to transmit data via an optical connection to other computing devices. For example, an optical transceiver device may be coupled to a port on the switch device, and may operate to transmit data optically via an optical cable to another transceiver device that is coupled to the optical cable and a port on a computing device. During the lifetime of the optical transceiver device, the optical transceiver device may experience many events and/or interactions with the switch device and, in some situations, with other computing devices (as the optical transceiver device may be connected to different devices (e.g., "swapped" between the switch device and other computing devices.) in some situations, these events/interactions may cause and/or indicate degradation of the optical transceiver device, indicate that the optical transceiver device is faulty, and/or indicate that the optical transceiver device is unsupported by the computing device to which it is coupled. While switch devices and other computing devices may track Cyclical Redundancy Check (CRC) information such as errors on ports, these errors are not persistent and not associated with the optical transceiver device that may contribute to the error. Thus, such error information does not travel with the optical transceiver device when the optical transceiver device is decoupled from the computing device to which it was coupled when the error occurred. For example, if a faulty optical transceiver device is returned from the field to the distributor or manufacturer, there is no mechanism by which to know about the history of that optical transceiver device. Furthermore, computing devices cannot determine whether an optical transceiver device that is newly connected to that computing device will be able to perform according to a performance standard expected by a user, or whether that optical transceiver device is even supported by that computing device, and such determinations ordinarily requires a time-consuming initialization process.

Accordingly, it would be desirable to provide an optical transceiver monitoring system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an optics monitoring engine that is configured to: monitor a port that is coupled to the processing system and, in response, detect one or more interactions between the port and an optical transceiver device; determine that the one or more interactions satisfy an event condition; and provide, in response to the one or more interactions satisfying the event condition, first event information that corresponds to the one or more interactions to the optical transceiver device for storage in a non-volatile memory system included in the optical transceiver device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
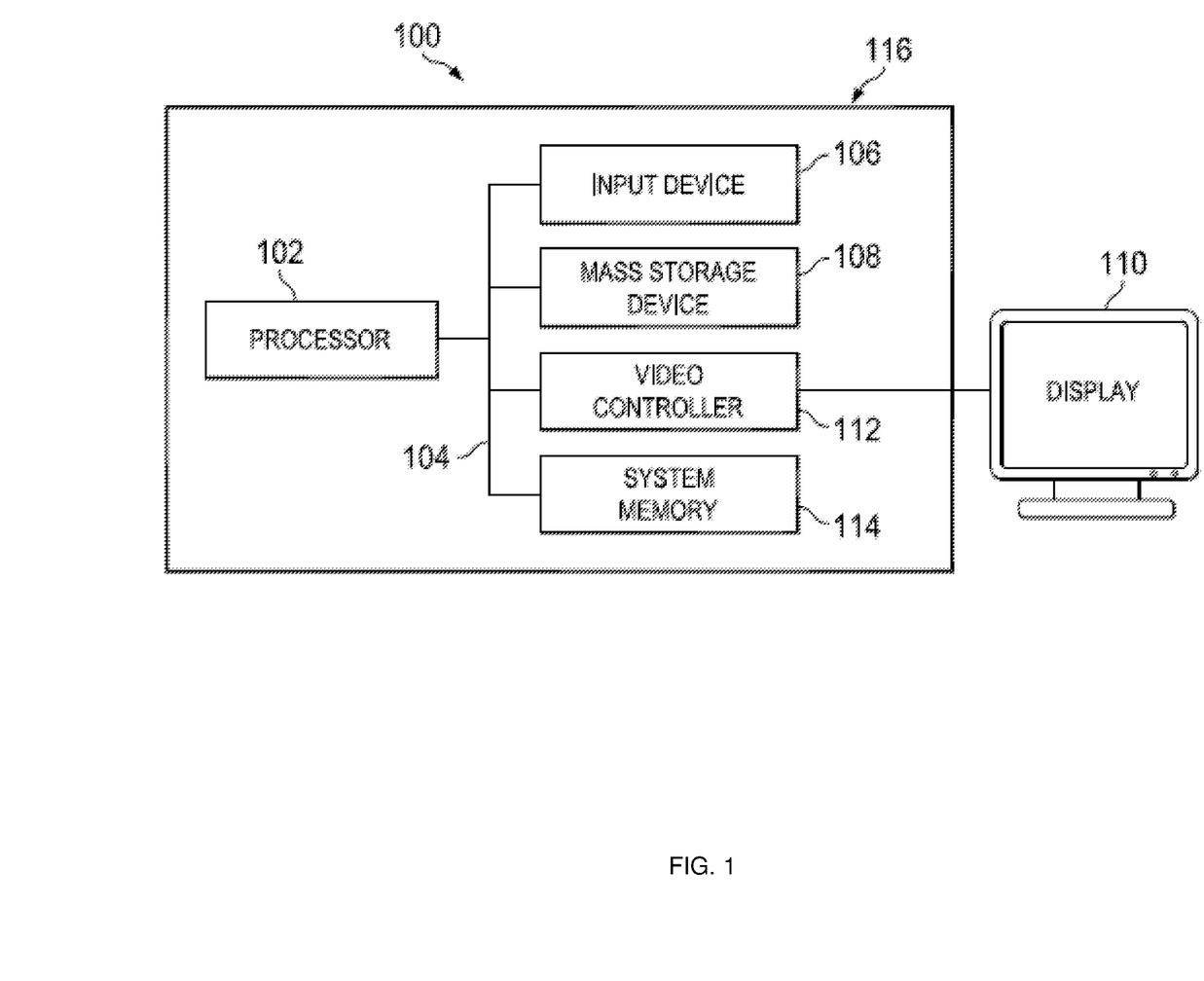
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
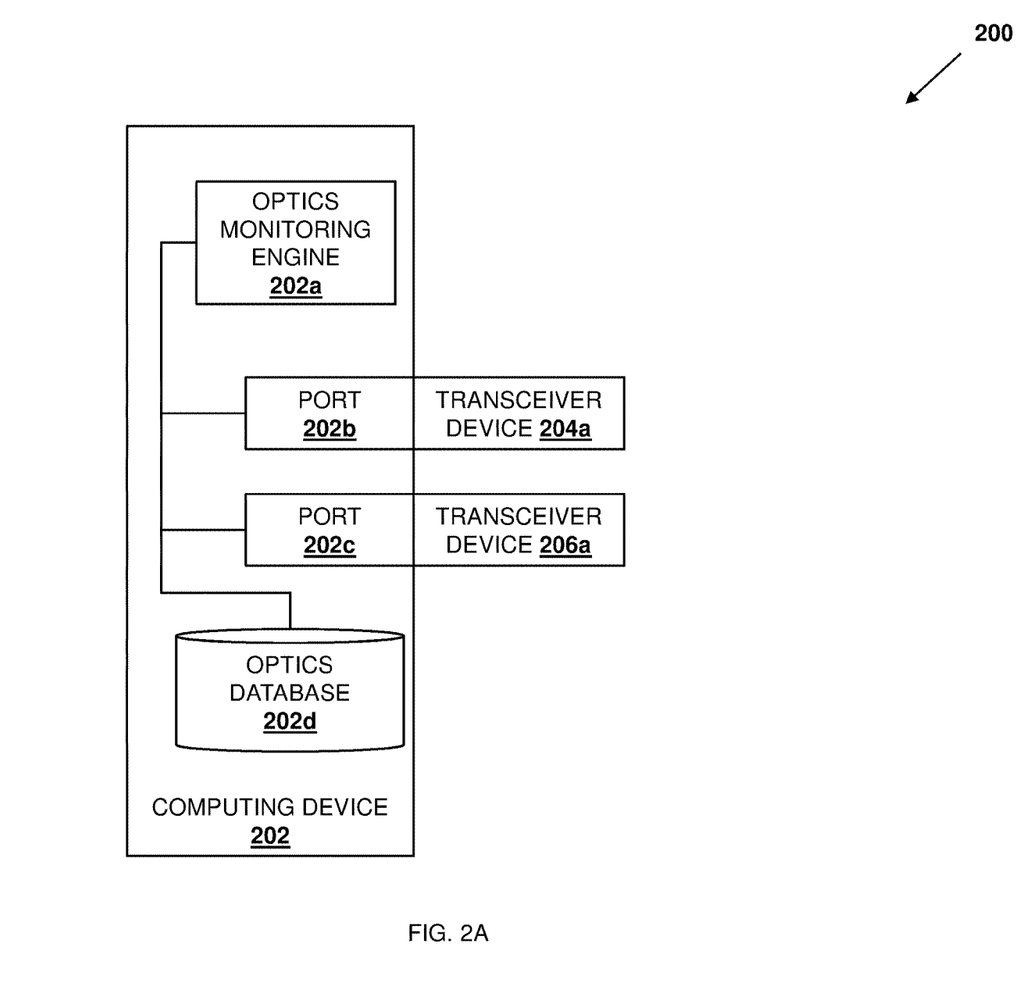
FIG. 2A is a schematic view illustrating an embodiment of an optical transceiver monitoring system.
Figure 2B:
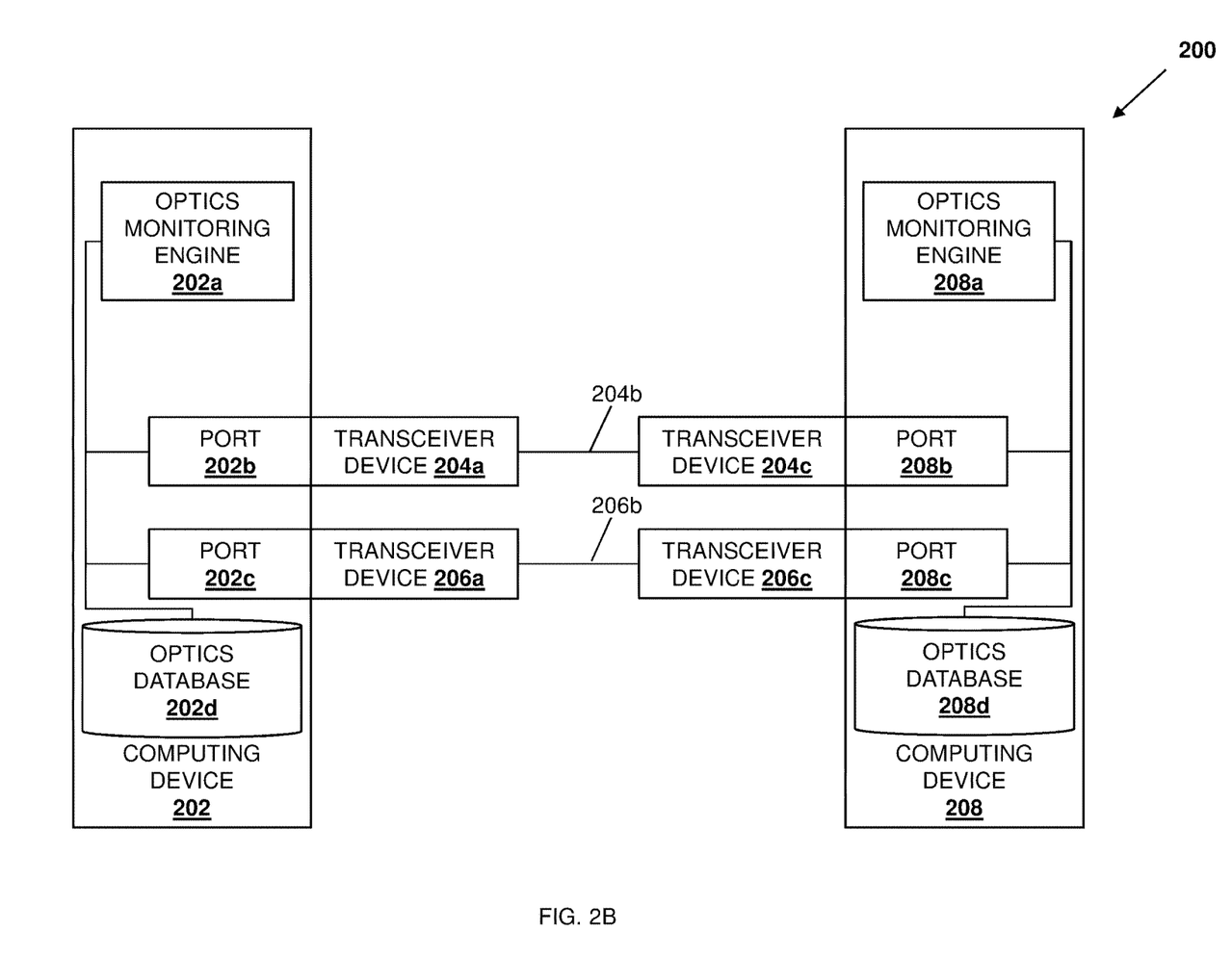
FIG. 2B is a schematic view illustrating an embodiment of an optical transceiver monitoring system.

Referring now to FIGS. 2A and 2B, an embodiment of an optical transceiver monitoring system 200 is illustrated. In the illustrated embodiment, the optical transceiver monitoring system 200 incudes a computing device 202. In an embodiment, the computing device 202 may be provided by the IHS 100 discussed above with reference to FIG. 1, and/or may include some or all of the components of the IHS 100, and in specific examples discussed below is provided by a networking device (e.g., a switch device, a router device, and/or other networking devices that would be apparent to one of skill in the art in possession of the present disclosure). However, while illustrated and discussed as a networking/switch device, one of skill in the art in possession of the present disclosure will recognize that computing devices provided in the optical transceiver monitoring system 200 may include any devices that may be configured to operate similarly as the computing device 202 discussed below while remaining within the scope of the present disclosure as well. For example, FIGS. 2A and 2B and the examples below describe the computing device 202 as a networking/switch device that may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an optics monitoring engine 202a that is configured to perform the functionality of the optics monitoring engines and/or the computing devices discussed below. The computing device 202 may also house a storage system (not illustrated, but which may include the storage device 108 discussed above with reference to FIG. 1) that is coupled to the optics monitoring engine 202a (e.g., via a coupling between the processing system and the storage system) and that includes an optics database 202d that is configured to store any of the information utilized by the optics monitoring engine 202a discussed below.

In the illustrated embodiment, the optics monitoring engine 202a in the computing device 202 is coupled to a plurality of ports 202b and up to 202c that are included on the computing device 202. For example, each of the ports 202b-202c may include an electrical coupling such as, for example, a copper-based female Ethernet connecter that is configured to transmit data (and, in some instances, power) via twisted pair electrical/copper wires included in a single Ethernet cable that is coupled to that port. In the illustrated embodiment, each of the ports 202b and up to 202c on the computing device 202 is connected to a respective optical module (e.g., a transceiver device 204a and up to 206a), discussed in further detail below with regard to FIG. 3. In some embodiments, the transceiver devices 204a-206a may be provided as a cabled system and, as illustrated in FIG. 2B, may include respective optical cables 204b and up to 206b that extend from each of the transceiver devices 204a-206a, and that connect to each of respective transceiver devices 204c and up to 206c.

In an embodiment, any or all of the transceiver devices 204a-206a and 204c-206c may be provided by the IHS 100 discussed above with reference to FIG. 1, and/or may include some or all of the components of the IHS 100. In various embodiments, any or all of the transceiver devices 204a-206a and 204c-206c may be provided by, for example, a Small Form Factor Pluggable (SFP) transceiver device, an enhanced SFP (SFP+) transceiver device, 10 Gigabit Small Form Factor Pluggable (XFP) transceiver device, a Quad SFP (QSFP) transceiver device, a X2 transceiver device, a XENPAK transceiver device, a Gigabit Interface Converter (GBIC) transceiver device, and/or any other transceiver devices that would be apparent to one of skill in the art in possession of the present disclosure. However, while illustrated and discussed as being provided by transceiver devices, one of skill in the art in possession of the present disclosure will recognize that transceiver devices provided in the optical transceiver monitoring system 200 may include any devices that may be configured to operate similarly as the transceiver devices 204a-206a and 204c-206c discussed below while remaining within the scope of the present disclosure as well.

As discussed in further detail below, in some embodiments the transceiver devices 204a-206a and 204c-206c and the respective cables 204b-206b that couple them together may be separate components that may be coupled together via couplings, as illustrated in FIG. 2A. However, in other embodiments, the transceiver devices 204a-206a and 204c-206c and the respective cables 204b-206b coupling them together may be integrated components (e.g., with the transceiver devices 204a/204c integrated with the cable 204b and the transceiver devices 206a/206c integrated with the cable 206b). Furthermore, while a few specific examples are described herein, one of skill in the art in possession of the present disclosure will appreciate that each transceiver pair and the respective cable between them that provide for the optical data transmission between respective ports on computing device pairs in the present disclosure may be provided in a variety of configurations that will fall within the scope of the present disclosure as well.

In the embodiment illustrated in FIG. 2B, the optical transceiver monitoring system 200 incudes a computing device 208. In an embodiment, the computing device 208 may be provided by the IHS 100 discussed above with reference to FIG. 1, and/or may include some or all of the components of the IHS 100, and in specific embodiments discussed below is provided by a networking device (e.g., a switch device, a router device, and/or other networking devices that would be apparent to one of skill in the art in possession of the present disclosure). However, while illustrated and discussed as a networking/switch device, one of skill in the art in possession of the present disclosure will recognize that computing devices provided in the optical transceiver monitoring system 200 may include any devices that may be configured to operate similarly as the computing device 208 discussed below while remaining within the scope of the present disclosure as well. For example, FIG. 2B and the examples below describe the computing device 208 as a networking/switch device that may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an optics monitoring engine 208*a* that is configured to perform the functionality of the optics monitoring engines and/or the computing devices discussed below. The computing device 208 may also house a storage system (not illustrated, but which may include the storage device 108 discussed above with reference to FIG. 1) that is coupled to the optics monitoring engine 208*a* (e.g., via a coupling between the processing system and the storage system) and that includes an optics database 208*d* that is configured to store any of the information utilized by the optics monitoring engine 208*a* discussed below.

In the illustrated embodiment, the optics monitoring engine 208*a* in the computing device 202 is coupled to a plurality of ports 208*b* and up to 208*c* on the computing device 208. For example, each of the ports 208*b*-208*c* may include an electrical coupling such as, for example, a copper-based female Ethernet connecter that is configured to transmit data (and, in some instances, power) via twisted pair electrical/copper wires included in a single Ethernet cable that is coupled to that port. In the illustrated embodiment, each of the ports 208*b* and up to 208*c* on the computing device 208 is connected to the respective optical module (e.g., the transceiver device 204*c* and up to 206*c* described above), discussed in further detail below with regard to FIG. 3. However, while a specific optical transceiver monitoring system 200 has been illustrated and described, one of skill in the art in possession of the present disclosure will recognize that optical transceiver monitoring system of the present disclosure may include a variety of components and component configurations while remaining within the scope of the present disclosure as well.

Figure 3:
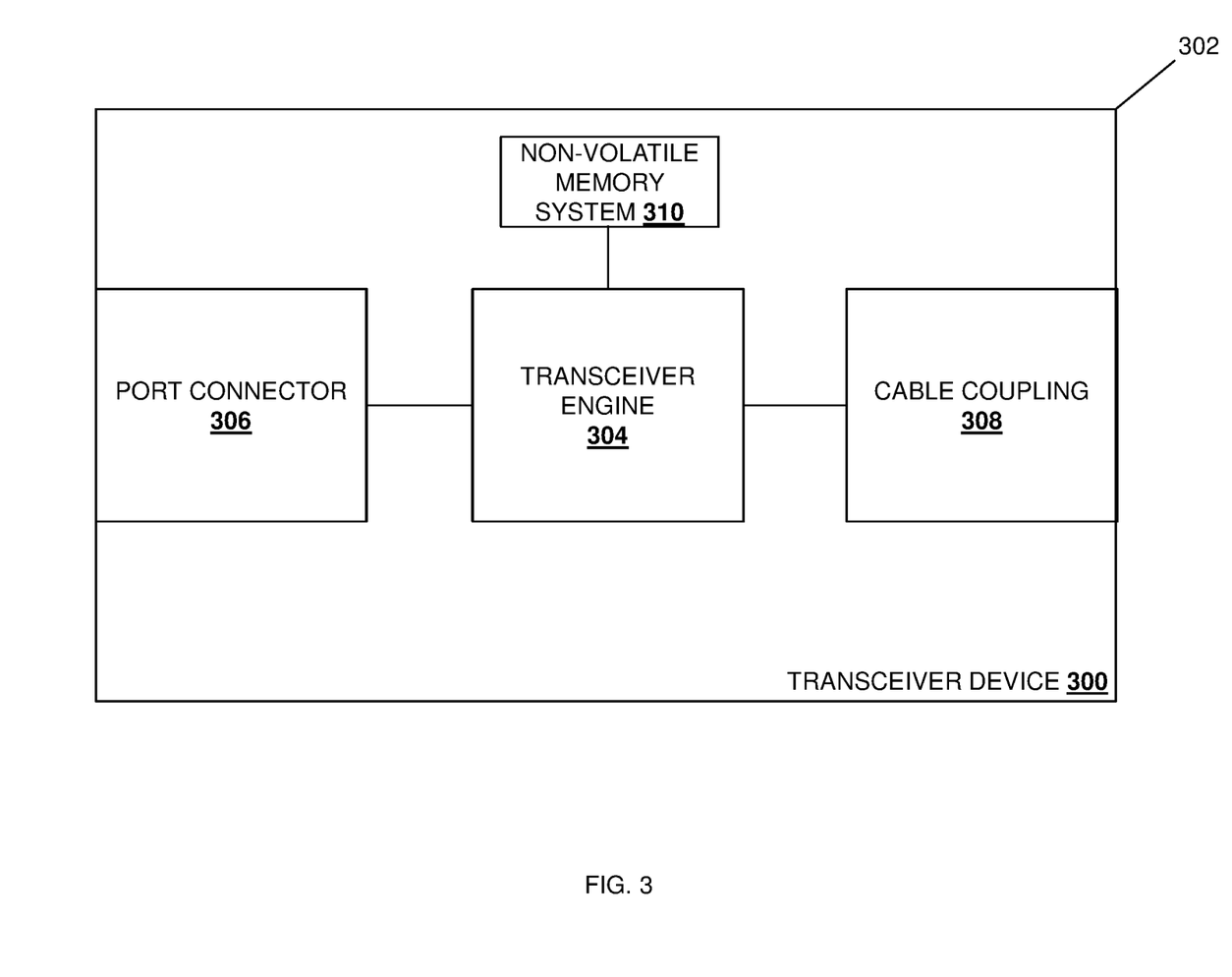
FIG. 3 is a schematic view illustrating an embodiment of a transceiver device that may be provided in the optical transceiver monitoring system of FIG. 2.

Referring now to FIG. 3, an embodiment of a transceiver device 300 is illustrated that may provide any or all of the transceiver devices 204*a*-206*a* and 204*c*-206*c* discussed above with reference to FIGS. 2A and 2B. As such, the transceiver device 300 may be provided by the IHS 100 discussed above with reference to FIG. 1 and/or may include some or all of the components of the IHS 100. Furthermore, while illustrated and discussed as a transceiver device, one of skill in the art in possession of the present disclosure will recognize that the functionality of the transceiver device 300 discussed below may be provided by other devices that are configured to operate similarly as the transceiver device 300 discussed below. In the illustrated embodiment, the transceiver device 300 includes a chassis 302 that houses the components of the transceiver device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a transceiver engine 304 that is configured to perform the functionality of the transceiver engines and/or transceiver devices discussed below.

As illustrated in FIG. 3, the chassis 302 may also include a port connector 306 that is coupled to the transceiver engine 304 (e.g., via a coupling between the port connector 306 and the processing system). Continuing with the example provided above, the port connector 306 may be a male Ethernet connector that is configured to receive data (and, in some instances, power transmitted via Power over Ethernet (PoE) techniques.) However, as discussed above, other coupling hardware may be utilized to connect the transceiver device 300 to ports on computing devices, as well as receive data transmitted via a single port on those computing devices, while remaining within the scope of the present disclosure as well.

The chassis 302 may also include a cable coupling 308 that is coupled to the transceiver engine 304 (e.g., via a coupling between the cable coupling 308 and the processing system). As illustrated and discussed in the examples below, the cable coupling 308 may be provided by a female connector that includes respective transceiver optical wire couplings that are configured to receive optical signal data transmitted by the transceiver engine 304 via one or more optical wires. For example, the optical wires may be provided by fiber optic wires, although one of skill in the art in possession of the present disclosure will appreciate that other optical wires and electrical wires will fall within the scope of the present disclosure as well. Furthermore, one of skill in the art in possession of the present disclosure will appreciate that the cable coupling 308 may be provided by other types of connectors (e.g., a male connector), may be an integrated coupling that integrates the transceiver device 300 with the cable described herein, and/or may include a variety of other components and/or component configurations while remaining within the scope of the present disclosure as well.

As discussed above, the chassis 302 may also house a memory system. As illustrated, the memory system may include a non-volatile memory system 310 that is coupled to the transceiver engine 304 (e.g., via a coupling between the non-volatile memory system 310 and the processing system). As illustrated and discussed in the examples below, the non-volatile memory system 310 may be provided by an Electrically Erasable Programmable Read-Only Memory (EEPROM), flash memory, and/or any other non-volatile programmable memory device that would be apparent to one of skill in the art in possession of the present disclosure. However, while a specific transceiver device 300 has been illustrated, one of skill in the art in possession of the present disclosure will recognize that transceiver devices (or other devices operating according to the teachings of the present disclosure in a manner similar to that described below for the transceiver device 300) may include a variety of components and/or component configurations for providing conventional transceiver device functionality, as well as the functionality discussed below, while remaining within the scope of the present disclosure as well.

Figure 4:
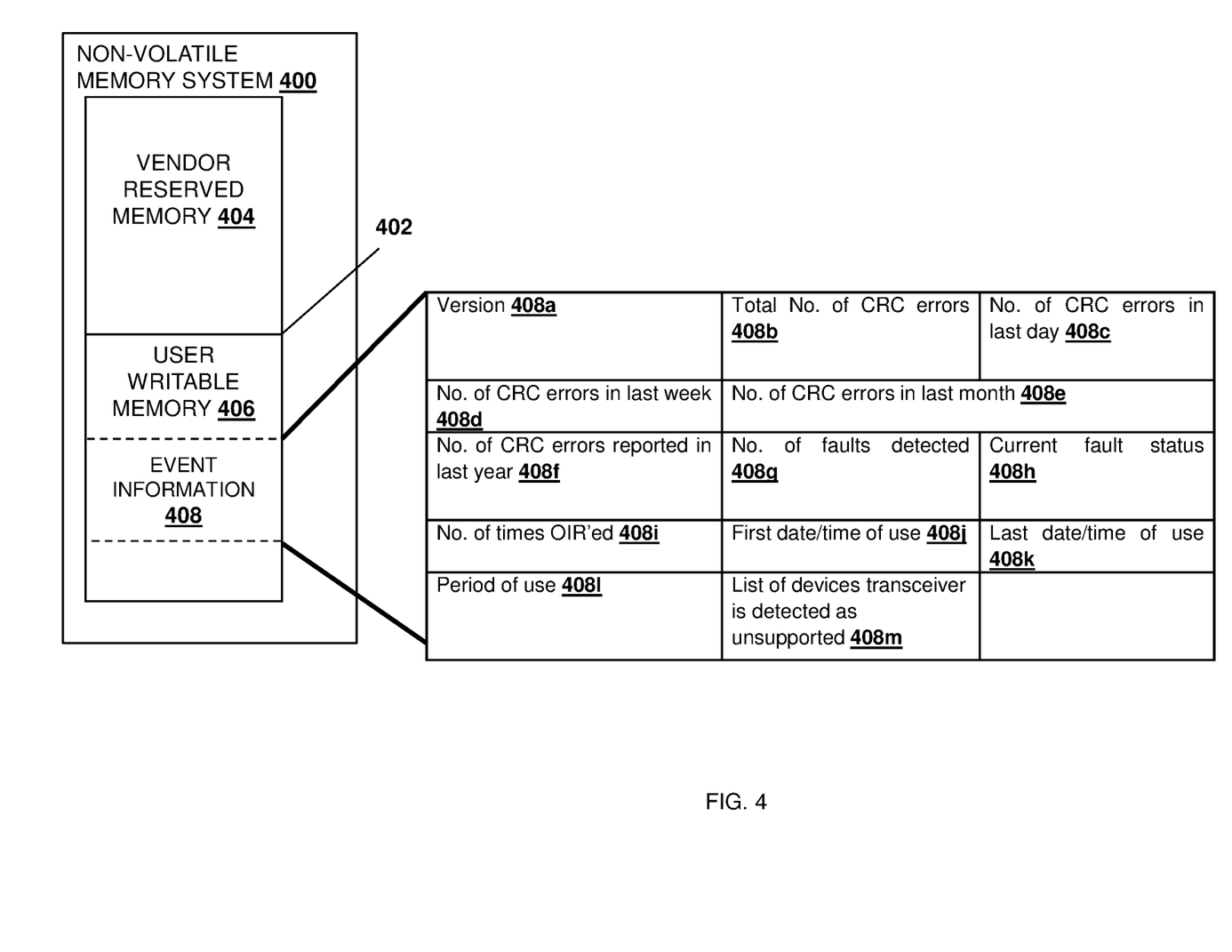
FIG. 4 is a schematic view illustrating an embodiment of a non-volatile memory system that may be provided in the transceiver device of FIG. 2.

Referring now to FIG. 4, an embodiment of a non-volatile memory system 400 is illustrated that may provide the non-volatile memory system 310 discussed above with reference to FIG. 3. As discussed above, the non-volatile memory system 400 may include an EEPROM that includes 160 bytes, 256 bytes, 512 bytes, 1 MB, and/or may be provided by any other size storage element that would be apparent to one of skill in the art in possession of the present disclosure. In an embodiment, one or more pages (e.g., page 402) in the non-volatile memory system 400 may be mapped to physical memory addresses of the non-volatile memory system 400. For example, in a 160 byte EEPROM, 32 bytes available in the EEPROM may be included in "page 0", and 128 bytes available in the EEPROM may be included in "page 2." In some examples, a portion of the non-volatile memory 400 may dedicated as a vendor reserved memory 404. As will be appreciated by one of skill in the art in possession of the present disclosure, conventional non-volatile memory systems provided in transceiver devices may include the vendor reserved memory 404 with information such as a serial identifier, transceiver capabilities, alarm and warning thresholds, calibration constants, security information such as passwords, vendor/manufacture information, and/or other information that would be apparent to one of skill in the art in possession of the present disclosure.

Furthermore, a portion of the non-volatile memory system 400 may also be dedicated as a user writable memory 406. For example, the user writable memory 406 may include a portion of the non-volatile memory system 400 to which a user of the transceiver device 300 of FIG. 3 may write data. As discussed in further detail below, embodiments of the present disclosure may use this user writable memory 406 to read and write event information 408 (also referred to as degradation information herein) corresponding to and/or otherwise associated with the transceiver device 300 that may be used for diagnostics and tracking of the transceiver device 300.

For example, the event information 408 may include information such as a version in a field 408a, a total number of CRC errors in a field 408b, a number of CRC errors in the last day in a field 408c, a number of CRC errors in the last week in a field 408d, a number of CRC errors in the last month in a field 408e, a number of CRC errors reported in the last year in a field 408f, a number of faults detected in a field 408g, a current fault status in a field 408h, a number of times an Online Insertion and Removal (01R) operation has been performed in a field 408i, a first date/time of use in a field 408j, a last date/time of use in a field 408k, a period of use in a field 408l, a list of devices that the transceiver is detected as unsupported in a field 408m, and/or any other performance information such as, for example, historical use information, degradation information, fault information, and/or any other information about the transceiver device 300 that would be apparent to one of skill in the art in possession of the present disclosure. In some embodiments, in order to ensure integrity of the event information 408, a checksum, a magic string, a hash, and/or other validation information may be added at the beginning or end of the event information 408, and may be used to validate the event information 408 before the event information 408 is read. However, while a specific non-volatile memory 400 has been illustrated, one of skill in the art in possession of the present disclosure will recognize that non-volatile memory (or other devices operating according to the teachings of the present disclosure in a manner similar to that described below for the non-volatile memory system 400) may include a variety of components and/or component configurations for providing conventional non-volatile memory functionality, as well as the functionality discussed below, while remaining within the scope of the present disclosure as well.

Figure 5:
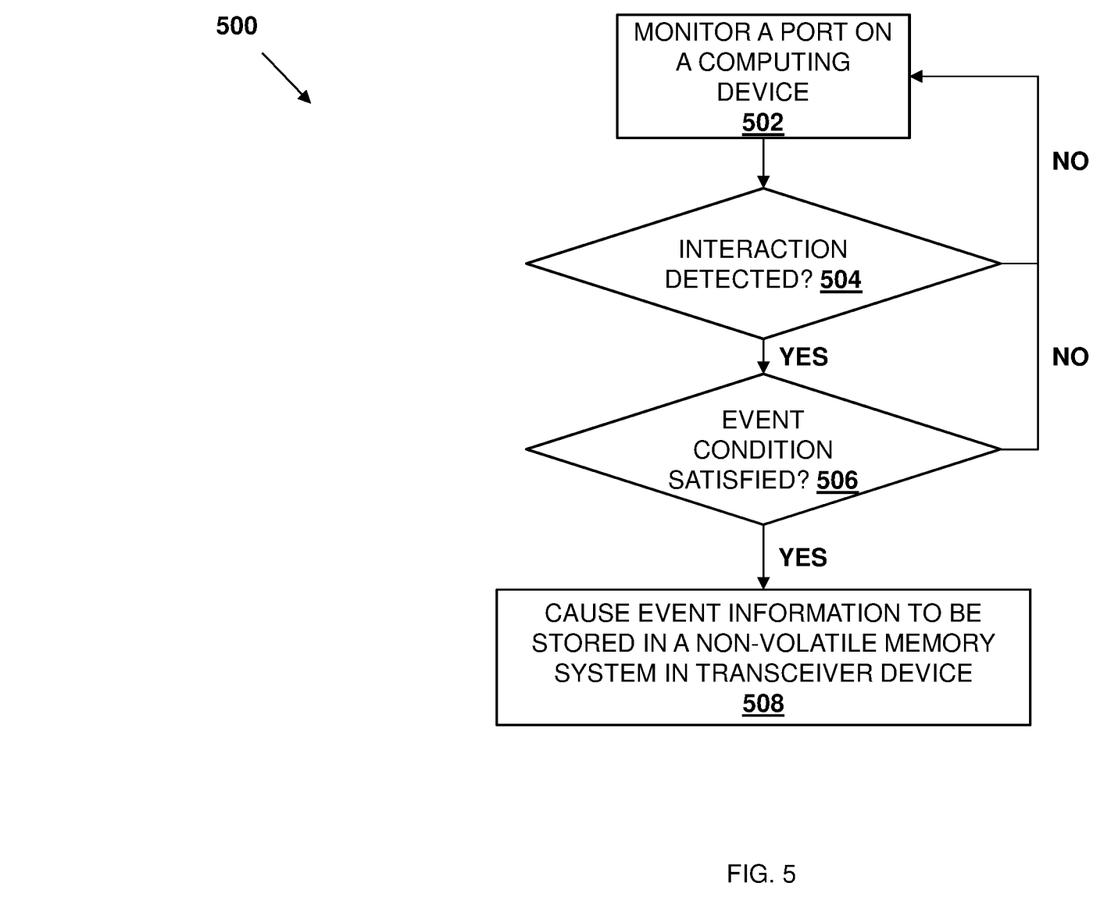
FIG. 5 is a flow chart illustrating an embodiment of a method for monitoring and tracking event information associated with a transceiver device.

Referring now to FIG. 5, an embodiment of a method 500 for monitoring and tracking event information associated with the use of an optical transceiver device is illustrated. As discussed above, an optical transceiver device may degrade over time, may experience faults, may be unsupported by various devices, and/or may experience other issues that may diminish the performance of the optical transceiver device, or that otherwise may make the optical transceiver device inoperable. As discussed below, the systems and methods of the present disclosure provide for the monitoring and logging of events that occur during the use of an optical transceiver device when that optical transceiver device interacts with a computing device, and/or when optical data transmissions are performed using the optical transceiver device. A computing device that is coupled to the optical transceiver device may monitor interactions (e.g., coupling and decoupling, optical data transmissions, etc.) between a port on the computing device and the optical transceiver device for events and, if an event occurs, the computing device may store corresponding event information in a non-volatile memory system that is included in the optical transceiver device. As such, any event information associated with the transceiver device will be stored in the non-volatile memory system even when the transceiver device is decoupled from the port on the computing device. As such, the event information associated with a transceiver device may be used for diagnostics, tracking, performance optimization, and/or other uses that would be apparent to one of skill in the art in possession of the present disclosure.

The method 500 begins at block 502 where a port on a computing device is monitored. In an embodiment, at block 502, the optics monitoring engine 202a may monitor the ports 202b and up to 202c that are included on the computing device 202 for interactions between those ports 202b-202c and a transceiver device (e.g., the transceiver devices 204a and 206a). For example, the optics monitoring engine 202a may monitor for interactions between the port 202b and the transceiver device 204a that may include, for example, optical data transmissions being provided via the transceiver device 204a to the port 202b, the decoupling and coupling (e.g., a OIR operation) of the transceiver device 204a with the port 202b, initialization of the port 202b and the transceiver device 204a, and/or other interactions that would be apparent to one of skill in the art in possession of the present disclosure.

The method 500 then proceeds to decision block 504 where it is determined whether one or more interactions between the optical transceiver device and the computing device are detected. In an embodiment, at decision block 504, the optics monitoring engine 202a may determine whether one or more interactions between the transceiver devices 204a-206a and the ports 202a-206c, respectively, have been detected. For example, the optics monitoring engine 202a may determine whether one or more interactions between the transceiver device 204a and the port 202a has occurred including, for example, detecting a coupling event between the port 202b and the transceiver device 204a, identifying a data transmission being provided between the port 202b and the transceiver device 204a, detecting a decoupling event between the port 202b and the transceiver device 204a, identifying an initialization between the port 202b and the transceiver device 204a, identifying a fault indication, identifying an error indication, and/or identifying or detecting any other interaction that would be apparent to one of skill in the art in possession of the present disclosure. If, at decision block 504, no interaction is detected between the transceiver device 204*a* and the port 202*b*, then the method 500 may return to block 502 to continue to monitor the ports on the computing device.

If, at decision block 504, one or more interactions are detected, then the method 500 proceeds to decision block 506 where it is determined whether the one or more interactions satisfy an event condition. In an embodiment, at decision block 506, the optics monitoring engine 202*a* may determine whether the one or more interactions satisfy an event condition. For example, the optics database 202*d* may store event conditions for which the optics monitoring engine 202*a* monitors, and the optics monitoring engine 202*a* may monitor the coupling and decoupling of the transceiver device 204*a* from the port 202*b* to determine whether the coupling and decoupling interactions satisfy an OIR event condition. In some examples, the coupling and/or decoupling of a transceiver device and a computing device by itself may satisfy a coupling event condition and a decoupling event condition, respectfully. In another example, data transmission interactions may be checked for CRC errors in order to determine whether the number of CRC errors satisfies a CRC error event condition, which may include determining whether a predefined number of CRC errors are detected in a predefined time period. In yet another example, detecting a fault indication may satisfy a fault event condition, while the initialization of the transceiver device 204*a* with the port 202*b* may result in an unsupported transceiver event condition. However, while a few examples of event conditions are discussed above, one of skill in the art in possession of the present disclosure will recognize that other event conditions will fall within the scope of the present disclosure as well.

If, at decision block 506, it is determined that the one or more interactions do not satisfy the event condition, then the method 500 returns to block 502 to continue to monitor the ports on the computing device. However, if at decision block 506 it is determined that the one or more interactions satisfy an event condition, then the method 500 proceeds to block 508 where first event information that corresponds to the one or more interactions is provided to the optical transceiver device for storage in a non-volatile memory system. In an embodiment, at block 508, the optics monitoring engine 202*a* may perform a write operation on the non-volatile memory system 310 included on the transceiver device 204*a* to write event information associated with the one or more interactions that were detected and determined to satisfy the event condition (or cause such event information to be written by the transceiver engine 304.) The optics monitoring engine 202*a* may write the event information using a protocol such as 120. For example, the optics monitoring engine 202*a* may have detected a CRC error in a data transmission, and may have determined that the CRC error satisfies the CRC error event condition. In response, the optics monitoring engine 202*a* may log the CRC error in the event information 408 stored in the user writable memory 406 in the non-volatile memory system 400 included in the transceiver device 204*a*. For example, the optics monitoring engine 202*a* may increment the values in the fields 408*b*-408*f* by the number of CRC errors that occurred subsequent to the last time the CRC error event condition was satisfied. In some examples, the values in the fields 408*b*-408*f* may be based on time and, as such, one skilled in the art will recognized that the values in the fields 408*b*-408*f* may be decreased based on the time of when the most recent CRC error(s) occurred.

In another example, the optics monitoring engine 202*a* may have detected a fault in the transceiver device 204, and may have determined that the fault satisfies a fault event condition. In response, the optics monitoring engine 202*a* may log the fault in the event information 408 stored in the user writable memory 406 in the non-volatile memory system 400 included in the transceiver device 204*a*. For example, the optics monitoring engine 202*a* may increment the values in the field 408*g* by the number of faults that occurred subsequent to the last time the fault event condition was satisfied. In yet another example, the current fault status may be updated in the current fault status field 408*h* when a current fault status event condition occurs (e.g., such that a change in the current fault status is required).

In yet another example, when the decoupling and recoupling of the transceiver device 204*a* satisfies an OIR event condition, then the optics monitoring engine 202*a* may log the OIR event in the event information 408 stored in the user writable memory 406 in the non-volatile memory system 400 included in the transceiver device 204*a*. For example, the optics monitoring engine 202*a* may update the field 408*i* in the event information 408 by incrementing the value provided in the "No. of times OIR'ed" field 408*i* by the number of OIRs that occurred subsequent to the last time the OIR event condition was satisfied. In another example, the optics monitoring engine 202*a* may determine that the one or more interactions satisfy a transceiver first use event condition. In response, the optics monitoring engine 202*a* may log the date/time of the transceiver device first use in the event information 408 stored in the user writable memory 406 in the non-volatile memory system 400 included in the transceiver device 204*a*. For example, the optics monitoring engine 202*a* may write the date and time in the "First date/time of use" field 408*j*, and in some situations may write the date and time in the "Last date/time of use" field 408*k* when a last use event condition is satisfied (e.g., after the transceiver device 204*a* has provided optical transmissions for a predetermine period of time). The optics monitoring engine 202*a* may also update the "Period of use" field 408*l* when a period of use event condition is satisfied (e.g., increment the period of use after a predetermined time interval of use has been satisfied).

In another example, the optics monitoring engine 202*a* may have detected that the transceiver device 204*a* is unsupported by the computing device 202 during, for example, an initialization/hand shake between the transceiver device 204*a* and the computing device 202, and determined that the unsupported transceiver device satisfies an unsupported transceiver event condition. In response, the optics monitoring engine 202*a* may log the type of computing device that does not support the transceiver device 204*a* in the event information 408 stored in the user writable memory 406 in the non-volatile memory system 400 included in the transceiver device 204*a*. For example, the optics monitoring engine 202*a* may write the computing device type identifier in the field 408*m*. However, while the event information is described as being written to the non-volatile memory system 400, the event information may also be stored in the optics database 204*d* as well. Furthermore, while specific information and event conditions are described above as being written to the event information 408, one of skill in the art in possession of the present disclosure will recognize that a variety of other information may satisfy an event condition, and that information may be written to the event information 408 while remaining within the scope of the present disclosure.

Figure 6:
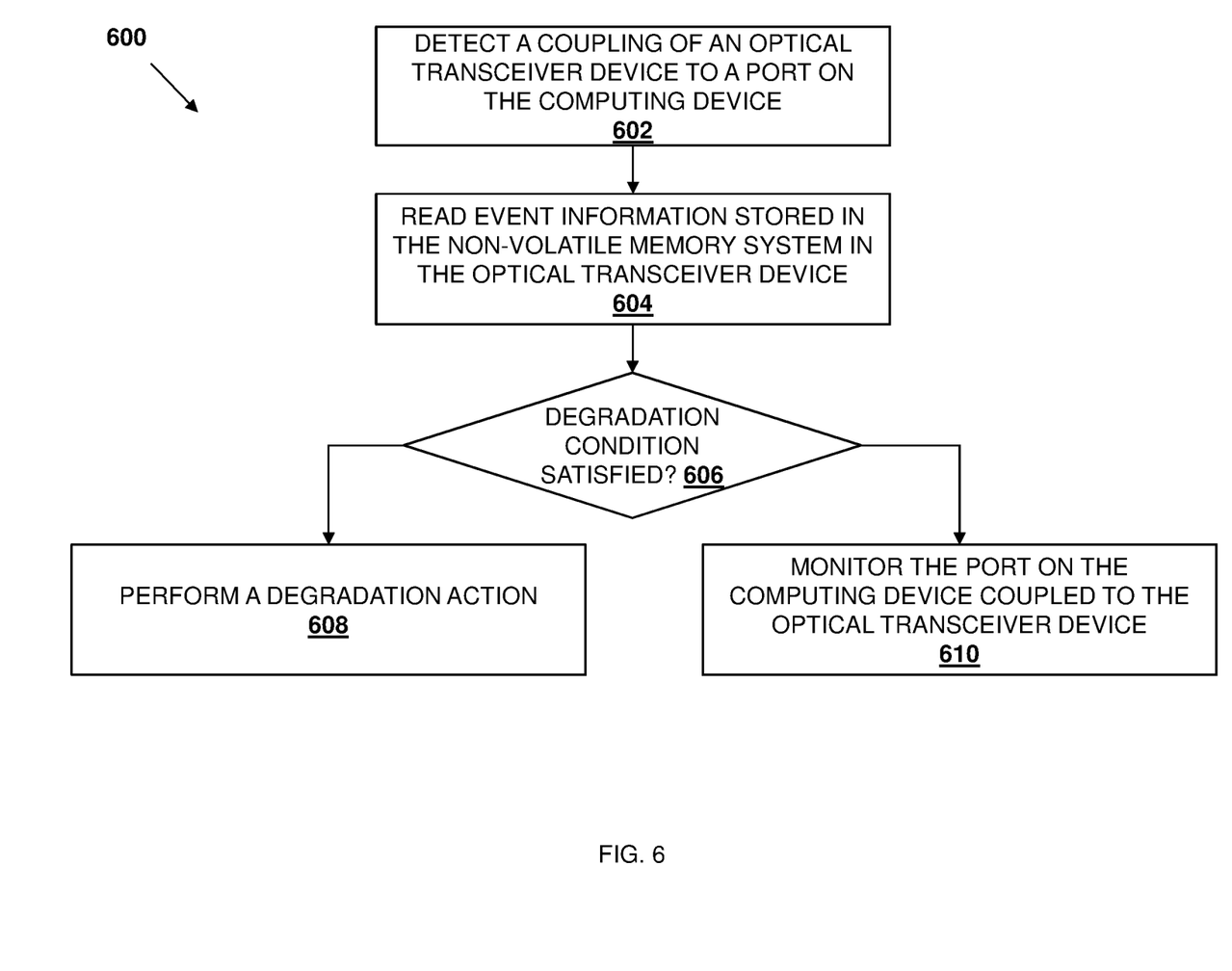
FIG. 6 is a flow chart illustrating an embodiment of a method for detecting a degraded transceiver device.

Referring now to FIG. 6, an embodiment of a method 600 for detecting a degraded optical transceiver device is illustrated. As discussed below, the systems and methods of the present disclosure provide for the detection of a degraded or an unsatisfactory optical transceiver device by reading the event information stored in non-volatile memory in the optical transceiver device, and determining whether the event information satisfies a degradation condition. In different embodiments, the method 600 may be performed when the optical transceiver device is initially connected to the port of the computing device, during the use of the optical transceiver device, and/or at other times that would be apparent to one of skill in the art in possession of the present disclosure. In the event a degradation condition is determined to exist per the method 600, an alert or other action may be provided to a user. As such, when an optical transceiver device is moved between computing devices, a user may easily and quickly determine whether the optical transceiver device is degraded by being, for example, incompatible with the computing device, faulty, and/or likely to provide diminished performance. Furthermore, a quality assurance administrator or other transceiver device support provider may receive the optical transceiver device from a customer, and access the event information from its non-volatile memory to learn any of a variety of diagnostic information about the optical transceiver device that may have been generated during the lifetime of that optical transceiver device.

The method 600 begins at block 602 where a coupling of an optical transceiver device to a port on a computing device is detected. In an embodiment, at block 602, the optics monitoring engine 202a may detect that the transceiver device 204a has been coupled to the port 202b. For example, a transceiver-to-port connection may be detected using interrupt registers that are present on the port 202b. As will be appreciated by one of skill in the art in possession of the present disclosure, the detection of a transceiver device to a port may be performed in a variety of manners that are know in the art, and thus is not discussed herein in detail.

The method 600 then proceeds to block 604 where event information stored in the non-volatile memory system in the optical transceiver device is read by the computing device. In an embodiment, at block 604 and in response to the optics monitoring engine 202a detecting the coupling of the transceiver device 204a to the port 202b, the optics monitoring engine 202a may read the event information 408 from the non-volatile memory system 400 included in the transceiver device 204a. Conventionally, the computing device 202 reads the information stored in the vendor reserved memory 404 when the transceiver device 204a is coupled to the port 202b and, as such, the event information 408 may be read from the user writable memory 406 by the computing device 202 when the vendor information is conventionally read by that computing device 202. However, while described as being read by the computing device 202 when the transceiver device 204a is coupled to the port 202b, the event information 408 stored in the user writable memory 406 of the non-volatile memory system 400 in the transceiver device 204a may be read by the optics monitoring engine 202a at any time the transceiver device 204a is coupled to the computing device 202. In some embodiments, once read from the transceiver device 204a, a copy of the event information 408 may be stored in the optics database 202d and may be updated as the event information 408 is updated on the non-volatile memory system 400.

The method 600 may then proceed to decision block 606 where it is determined whether the event information indicates that the optical transceiver device is experiencing a degradation condition. In an embodiment, at decision block 606, the optics monitoring engine 202a may determine whether the event information 408 (or a copy of the event information 408 stored in the optics database 410) satisfies a degradation condition. For example, rules for satisfying degradation conditions may be stored in the optics database 410 and used by the optics monitoring engine 202a at decision block 606. In a specific example, at decision block 606 the optics monitoring engine 202a may determine that a degradation condition is satisfied when the event information 408 in the field 408h indicates that the current fault status of the transceiver device 204a indicates a fault. In another specific example, the fault degradation condition may be satisfied when the event information 408 in the field 408g indicates a total/average number of faults that has satisfied a predetermined threshold. In yet another specific example, the fault degradation condition may be satisfied when the event information 408 in one or more of fields 408b-408f indicates a total/average number of CRC errors that has satisfied a predetermined threshold. In other specific examples, the optics monitoring engine 202a may determine that an age degradation condition is satisfied when the event information 408 in the fields 408j, 408k, and/or 408l indicates an age duration and/or a use duration has satisfied a predetermined threshold. In yet another specific example, the optics monitoring engine 202a may determine that an unsupported degradation condition is satisfied when the event information 408 in the field 408m identifies computing devices that do not support the transceiver device 204a, and optics monitoring engine 202a determines that the computing device 202 is one of the computing devices listed in the field 408m. However, while several examples of event information satisfying a degradation condition are illustrated above, one of skill in the art in possession of the present disclosure will recognize that a variety of event information may be used to determine whether other degradation conditions are satisfied while remaining within the scope of the present disclosure as well.

If, at decision block 606, it is determined that the degradation condition is satisfied, then the method 600 may proceed to block 608 where a degradation action may be performed. In an embodiment, at block 608, the optics monitoring engine 202a may perform an action in response to the degradation condition being satisfied. For example, the action performed by the optics monitoring engine 202a may include providing an alert to a user about the degradation condition that the transceiver device 204a is experiencing. Specifically, the optics monitoring engine 202a may provide an indication to a user that the transceiver device 204a is experiencing the degradation condition via a visual indicator (e.g., a Light Emitting Diode), an audio indicator (e.g., a speaker), a haptic feedback indicator, and/or via any other alerting techniques that would be apparent to one of skill in the art in possession of the present disclosure. In some embodiments, a visual indicator may be associated with the port 202b and/or with the transceiver device 204a in order to provide the degradation indications discussed above. In another example, the optics monitoring engine 202a may provide the degradation indication to the user via a graphical user interface provided on a display device that is directly coupled to the computing device 202, or that is coupled to a management device that is coupled the computing device 202 via a network.

In various embodiments, the degradation action performed by the optic monitoring engine 202a may include a mitigation action that limits the effect that the transceiver device 204a has on the transmission of data between the computing device 202 and the computing device 208. For example, due to a degradation condition in the transceiver device 204a, optical data transmissions may be sent via the transceiver device 206a, the cable 206b, and the transceiver device 206c rather than via the transceiver device 204a as part of the mitigation action(s). In other embodiments, a mitigation action may include isolating the transceiver device 204a completely. However, while various example actions are described, one of skill in the art in possession of the present disclosure will recognize that other actions may be performed in response to determining a degradation condition exists while remaining within the scope of the present disclosure as well.

If, at decision block 606, it is determined that the degradation condition is not satisfied, then the method 600 may proceed to block 610 where the port on the computing device that is coupled to the optical transceiver device is monitored. For example, the optics monitoring engine 202a may monitor the ports 202b and up to 202c that are on the computing device 202 for interactions between those ports 202b-202c and a transceiver device (e.g., the transceiver devices 204a and 206a). As such, block 610 of method 600 may be performed as part of block 502 in method 500 of FIG. 5.

In various embodiments of the present disclosure, an administrator may also access, at any time, the event information 408 stored on the transceiver device via a command line interface (CLI) that may return a transceiver device status output such as that illustrated in Table 1 below:

Table 1: Transceiver Device Status CLI Output Format
Total No of CRC errors: 21423
No of CRC errors in last day: 530
No of CRC errors in last week: 872
No of CRC errors in last month: 1023
No of CRC errors reported in last year: 15231
No of faults detected: 3
Current fault status: No fault
No of times OIRed: 7
First date/time of use: Jan. 1, 2011
Last date/time of use: Mar. 10, 2017
Period of use: 2432 days As such, an administrator may view the current status of the transceiver device 204a when desired.

Thus, systems and methods have been described that provide for the logging of event information on an optical transceiver device, and detecting from that event information whether the optical transceiver device satisfies a degradation event. For example, an optical transceiver device may be monitored for interactions with a computing device port to determine whether relevant events occur, and corresponding event information associated with the event may be written to user writable memory provided by a non-volatile memory system included in the optical transceiver device. As such, that event information may be persistent such that, as an optical transceiver device is moved between computing devices, a user may easily and quickly determine whether the optical transceiver device is degraded due to, for example, being incompatible with the computing device, being faulty, and/or providing a diminished performance. Furthermore, the computing device itself may monitor the event information for degradation conditions, and may report those degradation conditions to a user and/or perform any mitigation action that limits the effect the optical transceiver device has on the transmission of data between computing devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An optical transceiver monitoring system, comprising:
an optical transceiver device that includes a non-volatile memory system; and
a computing device that includes a computing device port that is connected to an optical transceiver device port connector on the optical transceiver device, wherein the computing device is configured to:
perform at least one of:
transmitting, via the computing device port and the optical transceiver device port connector, electrical data to the optical transceiver device to cause the optical transceiver device to convert that electrical data to optical data and transmit the optical data via an optical cable coupling; or
receiving, via the computing device port and the optical transceiver device port connector, electrical data from the optical transceiver device that was provided by the optical transceiver device using optical data received via the optical cable coupling;
detect, at the computing device port through which the electrical data is transmitted to the optical transceiver device or the electrical data is received from the optical transceiver device, one or more interactions between the optical transceiver device and the computing device;
determine that the one or more interactions satisfy an event condition; and
provide, in response to the one or more interactions satisfying the event condition and via the computing device port and the optical transceiver device port connector for storage in the non-volatile memory system in the optical transceiver device, first event information that corresponds to the one or more interactions.

2. The system of claim 1, wherein the computing device is configured to:
detect the coupling of the optical transceiver device to the computing device port; and
read second event information from the non-volatile memory system in the optical transceiver device.

3. The system of claim 2, wherein the computing device is configured to:
determine that the second event information indicates that the optical transceiver device is experiencing a degradation condition; and
provide an indication to a user that the optical transceiver device is experiencing the degradation condition.

4. The system of claim 3, wherein the degradation condition is at least one of a fault degradation condition, an age degradation condition or an unsupported optical transceiver device condition.

5. The system of claim 2, wherein the computing device is configured to:
determine that the second event information indicates that the optical transceiver device is not experiencing a degradation condition and, in response, monitor the computing device port.

6. The system of claim 2, wherein the storage of the first event information in the non-volatile memory system updates at least a portion of the second event information.

7. The system of claim 1, wherein the computing device is configured to:
   determine that the first event information indicates that the optical transceiver device is experiencing a degradation condition; and
   provide an indication to a user that the optical transceiver device is experiencing the degradation condition.

8. The system of claim 1, wherein the first event information is stored in a user writable memory portion of the non-volatile memory system.

9. An Information Handling System (IHS), comprising:
   a processing system; and
   a memory system that is coupled to the processing system and that includes instructions that, when executed by the processing system, cause the processing system to provide an optics monitoring engine that is configured to:
      perform at least one of:
         transmitting, via a port connected to the processing system, electrical data to an optical transceiver device to cause the optical transceiver device to convert that electrical data to optical data and transmit the optical data via an optical cable coupling; or
         receiving, via the port, electrical data from the optical transceiver device that was provided by the optical transceiver device using optical data received via the optical cable coupling;
      detect, at the port through which the electrical data is transmitted to the optical transceiver device or the electrical data is received from the optical transceiver device, one or more interactions between the port and the optical transceiver device;
      determine that the one or more interactions satisfy an event condition; and
      provide, in response to the one or more interactions satisfying the event condition and via the port to the optical transceiver device for storage in a non-volatile memory system included in the optical transceiver device, first event information that corresponds to the one or more interactions to the optical transceiver device.

10. The IHS of claim 9, wherein the optics monitoring engine is configured to:
   detect the coupling of the optical transceiver device to the port; and
   read second event information from the non-volatile memory system in the optical transceiver device.

11. The IHS of claim 10, wherein the optics monitoring engine is configured to:
   determine that the second event information indicates that the optical transceiver device is experiencing a degradation condition; and
   provide an indication to a user that the optical transceiver device is experiencing the degradation condition.

12. The IHS of claim 11, wherein the degradation condition is at least one of a fault degradation condition, an age degradation condition or an unsupported optical transceiver device condition.

13. The IHS of claim 10, wherein the optics monitoring engine is configured to:
   determine that the second event information indicates that the optical transceiver device is not experiencing a degradation condition and, in response, monitor the port.

14. The IHS of claim 10, wherein the storage of the first event information in the non-volatile memory system updates at least a portion of the second event information.

15. The IHS of claim 9, wherein the optics monitoring engine is configured to:
   determine that the first event information indicates that the optical transceiver device is experiencing a degradation condition; and
   provide an indication to a user that the optical transceiver device is experiencing the degradation condition.

16. A method of logging events corresponding with the use of an optical transceiver device, comprising:
   performing, by a computing device, at least one of:
      transmitting, via a port that is included on the computing device, electrical data to an optical transceiver device to cause the optical transceiver device to convert that electrical data to optical data and transmit the optical data via an optical cable coupling; or
      receiving, via the port that is included on the computing device, electrical data from the optical transceiver device that was provided by the optical transceiver device using optical data received via the optical cable coupling;
   detecting, by the computing device at the port through which the electrical data is transmitted to the optical transceiver device or the electrical data is received from the optical transceiver device, one or more interactions between the port and the optical transceiver device;
   determining, by the computing device, that the one or more interactions satisfy an event condition; and
   providing, by the computing device and in response to the one or more interactions satisfying the event condition, first event information that corresponds to the one or more interactions to the optical transceiver device for storage in a non-volatile memory system included in the optical transceiver device.

17. The method of claim 16, further comprising:
   detecting, by the computing device, the coupling of the optical transceiver device to the port; and
   reading, by the computing device, second event information from the non-volatile memory system in the optical transceiver device.

18. The method of claim 17, further comprising:
   determining, by the computing device, that the second event information indicates that the optical transceiver device is experiencing a degradation condition; and
   providing, by the computing device, an indication to a user that the optical transceiver device is experiencing the degradation condition.

19. The method of claim 17, further comprising:
   determining, by the computing device, that the second event information indicates that the optical transceiver device is not experiencing a degradation condition and, in response, monitor the port.

20. The method of claim 16, further comprising:
   determining, by the computing device, that the first event information indicates that the optical transceiver device is experiencing a degradation condition; and
   providing, by the computing device, an indication to a user that the optical transceiver device is experiencing the degradation condition.

* * * * *